(12) United States Patent
Koulas

(10) Patent No.: US 10,562,464 B2
(45) Date of Patent: Feb. 18, 2020

(54) VEHICLE MOUNTED CRASH IMPACT ATTENUATOR

(71) Applicant: Delphi Technologies, LLC, Troy, MI (US)

(72) Inventor: Theodoros Koulas, Pulheim (DE)

(73) Assignee: Delphi Technolgies, LLC, Troy, MI (US)

( * ) Notice: Subject to any disclaimer, the term of this patent is extended or adjusted under 35 U.S.C. 154(b) by 0 days.

(21) Appl. No.: 15/948,333

(22) Filed: Apr. 9, 2018

(65) Prior Publication Data

US 2018/0297538 A1    Oct. 18, 2018

(30) Foreign Application Priority Data

Apr. 14, 2017  (EP) ..................................... 17166688

(51) Int. Cl.
  *B60R 11/00* (2006.01)
  *F16F 13/04* (2006.01)
  *F16M 13/02* (2006.01)

(52) U.S. Cl.
  CPC .............. *B60R 11/00* (2013.01); *F16F 13/04* (2013.01); *F16M 13/02* (2013.01); *B60R 2011/004* (2013.01); *B60R 2011/0049* (2013.01); *B60R 2011/0082* (2013.01)

(58) Field of Classification Search
  CPC ....... B60R 11/10; B60R 11/00; B60R 19/483; B60R 2011/004; B60R 2011/0049; B60R 2011/0082; F16F 13/04; F16M 13/02; G01D 11/30; H01H 35/142; B62D 21/15; B62D 21/152; B62D 21/155; G01S 13/931; G01S 7/4813; G01S 2013/9375
  See application file for complete search history.

(56) References Cited

U.S. PATENT DOCUMENTS

| | | | | |
|---|---|---|---|---|
| 2,023,806 | A * | 12/1935 | Ferk | ...................... B60R 19/483 340/425.5 |
| 5,192,838 | A | 3/1993 | Breed et al. | |
| 5,984,293 | A * | 11/1999 | Abrahamson | .......... B23Q 1/035 269/236 |
| 9,956,993 | B1 * | 5/2018 | Klop | ..................... G01S 13/931 |
| 2008/0290672 | A1 | 11/2008 | Faass et al. | |
| 2018/0301795 | A1 * | 10/2018 | Lopez, Jr. | ............ H01Q 1/3283 |

FOREIGN PATENT DOCUMENTS

DE    102015209904 A1    12/2016

* cited by examiner

*Primary Examiner* — Christopher Garft
(74) *Attorney, Agent, or Firm* — Joseph V. Bonadies

(57) ABSTRACT

A sensor support assembly comprising a frame member adapted to be fixed on a vehicle structure and a support member adapted to be inserted in a recess defined in the frame member, the recess defining an axis along which the support member can switch from a normal position to a collapse position, the support member being guided during the displacement.

21 Claims, 6 Drawing Sheets

VEHICLE MOUNTED CRASH IMPACT ATTENUATOR

TECHNICAL FIELD OF INVENTION

The present invention relates to a sensor support assembly adapted to be arranged on a vehicle and to collapse upon a collision with another object.

BRIEF DESCRIPTION OF DRAWINGS

The present invention is now described by way of example with reference to the accompanying drawings in which.

DETAILED DESCRIPTION

Figure 1:
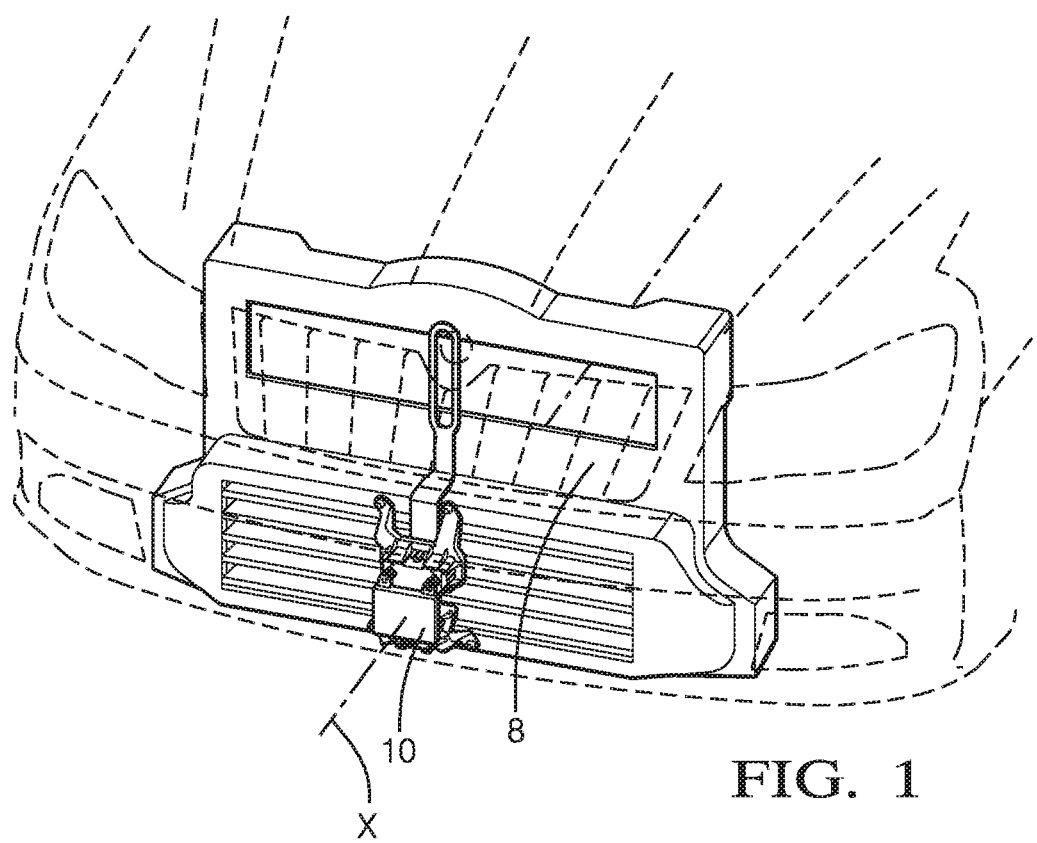
FIG. 1 is a general view of a vehicle front illustrating an Automotive Radar sensor fixed on a sensor support assembly in accordance with one embodiment.

A crash Middle Range Radar—MRR—or more generally Automotive Radar sensor 10 fixed on a collapsible sensor support assembly 12 is arranged, for instance in the front of a car so that, in case of a low speed crash the extent of damages at the vehicle structure 8 will be minimized by only replacing the sensor 10 and sensor support assembly 12. It is of utmost importance that the support assembly permanently rests in a normal position and only collapses when a crash occurs and considering the automotive compliance durability standards, all manufacturing and assembling tolerances as well as environmental conditions, the support member 16 must collapse linearly under a predetermined force, without bending, rotating or being stuck.

Accordingly, it is an object of the present invention to resolve the above mentioned problems in providing a sensor support assembly 12 comprising a frame member 14 adapted to be fixed on a vehicle structure 8 and a support member 16 adapted to be inserted in a recess 26 defined in the frame member 14. The recess 26 defines a longitudinal axis along which the support member 16 can switch from a normal position to a collapse position when an axial force applied on the support member 16 exceeds a predetermined threshold. The support member 16 is substantially outside the recess 26 in the normal position and substantially inside the recess 26 in the collapse position, the support member 16 being guided during the displacement between side faces of the recess 32 and side faces of the support member 28.

Also, the sensor support assembly 12 further comprises a male guiding member 34 cooperating with a complementary female guiding member 36 aligned along the longitudinal axis.

Also, the male guiding member 34 is integral to the support member 16 and, the female guiding member 36 is defined in the frame member 14.

In another alternative, the male guiding member 34 is integral to the frame member 14 and, the female guiding member 36 is defined in the support member 16.

Also, whatever the embodiment, the male guiding member 34 has a T-shaped cross section.

Also, the sensor support assembly 12 comprises several a male and female guiding members 34,36 cooperating with one other and arranged on different sides of the recess 26 and of the support member 16.

Also, the sensor support assembly 12 further comprises a guiding rail arranged in a clearance defined between the support member 16 and the side faces of the recess 26. The rail is integral to the frame member 14 and it defines an longitudinal linear tip in contact against an opposing side face of the support member 28.

In another alternative, the rail is integral to the support member 16 and it defines a longitudinal linear tip in contact against an opposing side face of the recess 32.

Also, the linear tip defines a sharp edge in permanent contact with the opposing side face, the sharp edge scribing an axial line in the opposing side face when the support member 16 moves from the normal position (P1) to the collapse position (P2).

Also, the sensor support assembly 12 further comprises a compliant member 44 holding the support member 16 in the normal position as long as the longitudinal force applied on the support member 16 is inferior to the predetermined threshold, the compliant member 44 breaking away and displacing under the influence of the support member 16 moving from the normal position to the collapse position.

Also, the compliant member 44 comprises a short elastic arm 44 extending from the frame member 14 to a distant head 48 in contact against a side face of the support member 28 or, in another alternative, the short elastic arm 44 extends from the support member 16 to a distant head 48 in contact against an opposed side face of the recess 32.

Moreover, the sensor support assembly 12 comprises a plurality of the short elastic arms 44 arranged around the support member 16.

Also, the sensor support assembly 12 further comprises a retaining member retaining the support member 16 in the normal position and wherein, the retaining member comprises a locking clip arranged at the end of a locking arm 46 extending from the frame member 14, the clip defining a locking face engaged against a complementary locking face of the support member 16.

Also, the retaining member comprises a locking clip arranged at the end of a locking arm 46 integral to the support member 16, the clip defining a locking face engaged against a complementary locking face of the frame member 14.

Moreover, the support member 16 comprises a plurality of the retaining members.

Also, in the normal position the support member 16 axially urges the short elastic arms 44 which react by applying to the support member 16 an axial counter force opposed to the collapse direction, the support member 16 being kept in the normal position by the locking clip.

Also, the collapse threshold force is predetermined by the counter forces generated by the short elastic arms 44.

The sum of the individual counter forces applied by each of the short elastic arms 44 is equal to the predetermined threshold.

Also, the sensor support assembly 12 comprises a plurality of holding sets 42 arranged around the recess 26, each set comprising two short elastic arms 44 applying counter forces and arranged on both sides of a locking arm 46 retaining the support member 16 in the normal position, wherein the two short elastic arms 44 are aligned with the locking arm 46.

Figure 2:
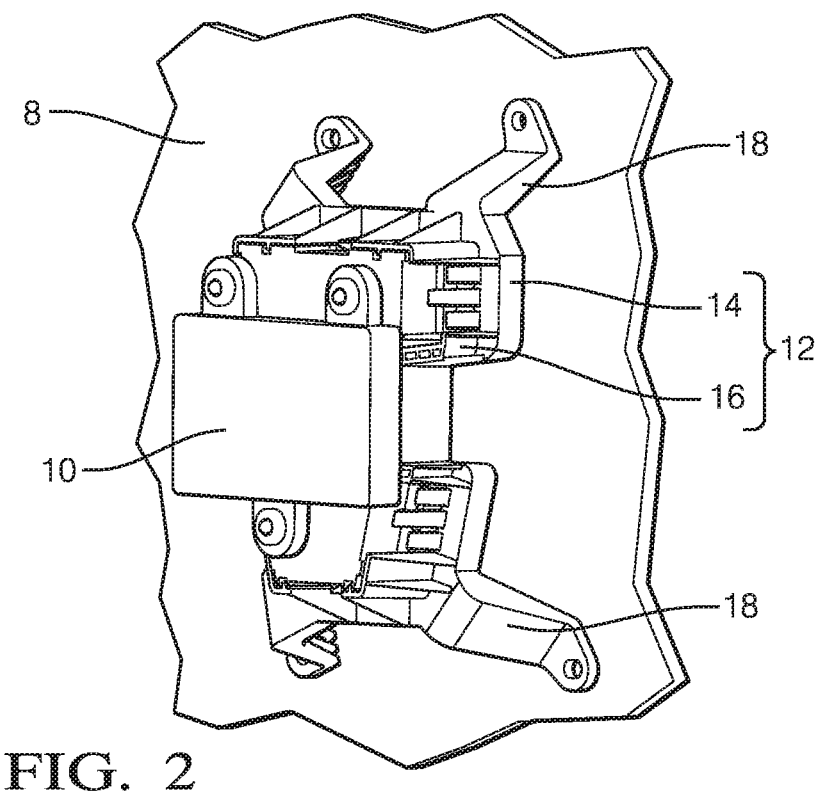
FIG. 2 is the automotive radar sensor and the sensor support assembly of FIG. 1 in accordance with one embodiment.

An automotive radar sensor 10 arranged on the front structure 8 of a vehicle so it is aligned along the longitudinal axis X of the vehicle senses the area before the vehicle enabling to prevent, or at least to mitigate, frontal collisions. Such an embodiment, represented on FIG. 1, can be replicated by arranging the sensor 10 in the rear of the car for detecting back collisions. FIG. 2 magnifies the sensor 10 arranged on a sensor support assembly 12 that comprises a frame member 14 cooperating with a support member 16. The frame member 14 is provided with holding legs 18 for fixing the sensor support assembly 12 on the structure 8 of the vehicle and, the support member 16, held in a longitudinal recess 26 of the frame member 14, is arranged to receive the sensor 10. The frame member 14 and support member 16 cooperate to enable the sensor support assembly 12 to collapse in case of a crash.

Figure 3A:
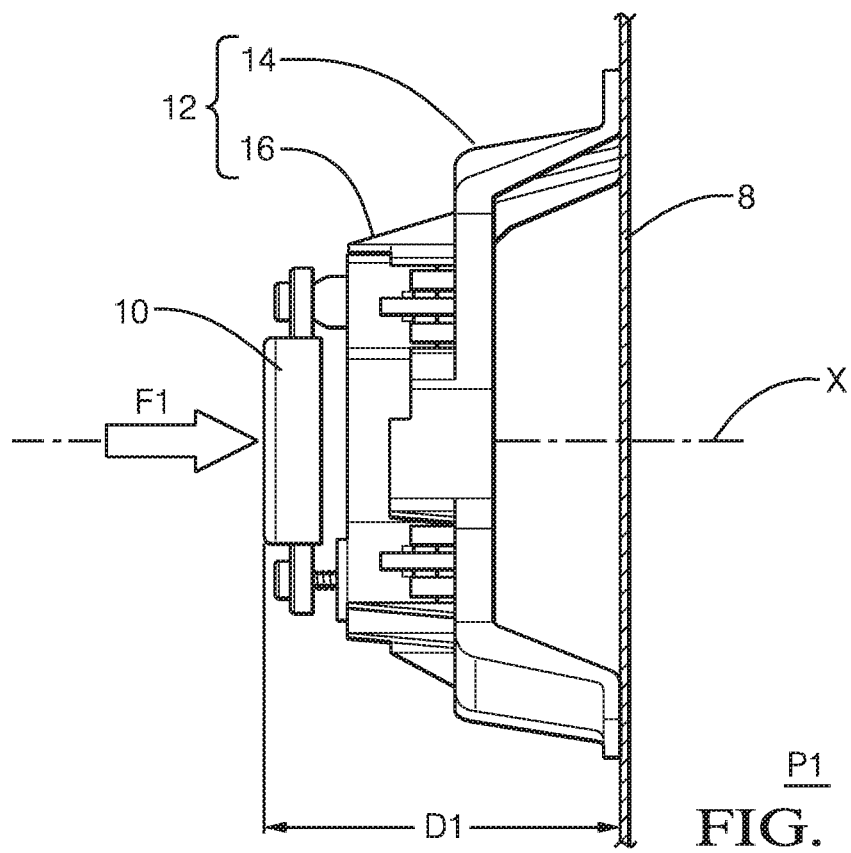
FIG. 3a is a side view of the assembly of FIG. 2 in a normal position in accordance with one embodiment.
Figure 3B:
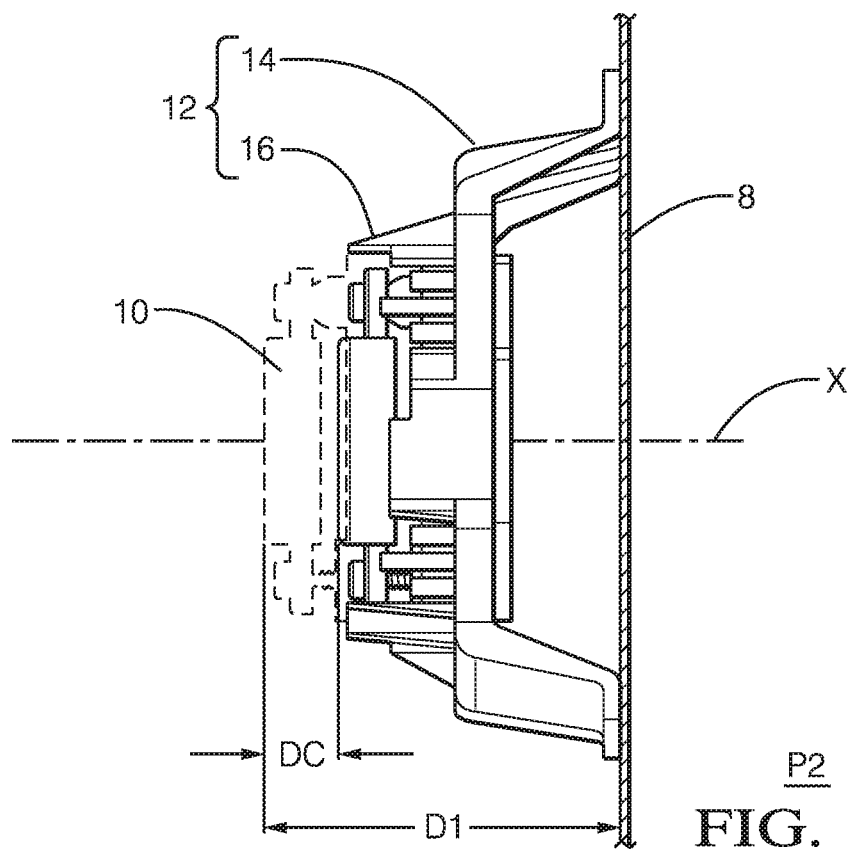
FIG. 3b is a side view of the assembly of FIG. 2 in a collapsed position in accordance with one embodiment.

Under the influence of the frontal rearward force F1 exceeding a force threshold F0, the sensor support assembly 12 collapses from a normal position P1, or pre-crash position shown atop of FIG. 3 (3a), to a collapse position P2, or post-crash position represented just below (3b). In the normal position P1 the sensor 10 is at a normal distance D1 from the vehicle structure 8 and, in the collapse position P2 the sensor 10 and the support member 16 have moved in the rearward direction toward the structure 8 by a collapsed distance DC, while the frame member 14 has not moved.

Figure 4:
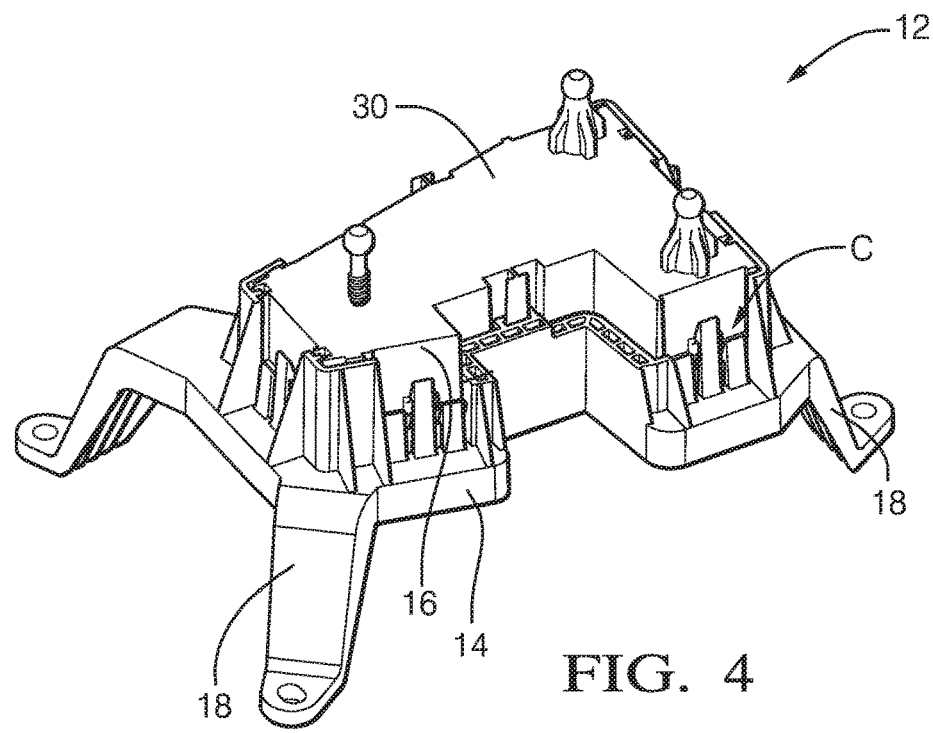
FIG. 4 is the sensor support assembly of the preceding figures, comprising a frame member and a support member in accordance with one embodiment.
Figure 5:
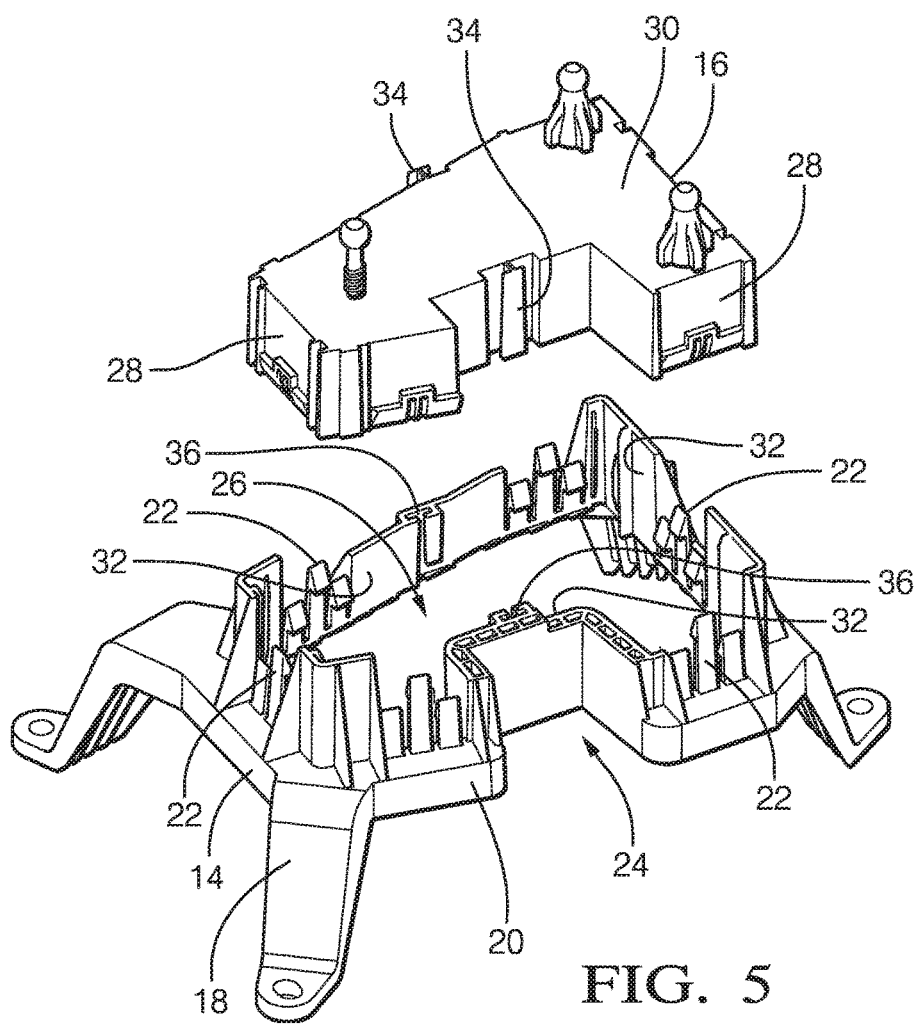
FIG. 5 illustrates the sensor support assembly of FIG. 4 before assembly, FIG. 5 being viewed from the upper side in accordance with one embodiment.
Figure 6:
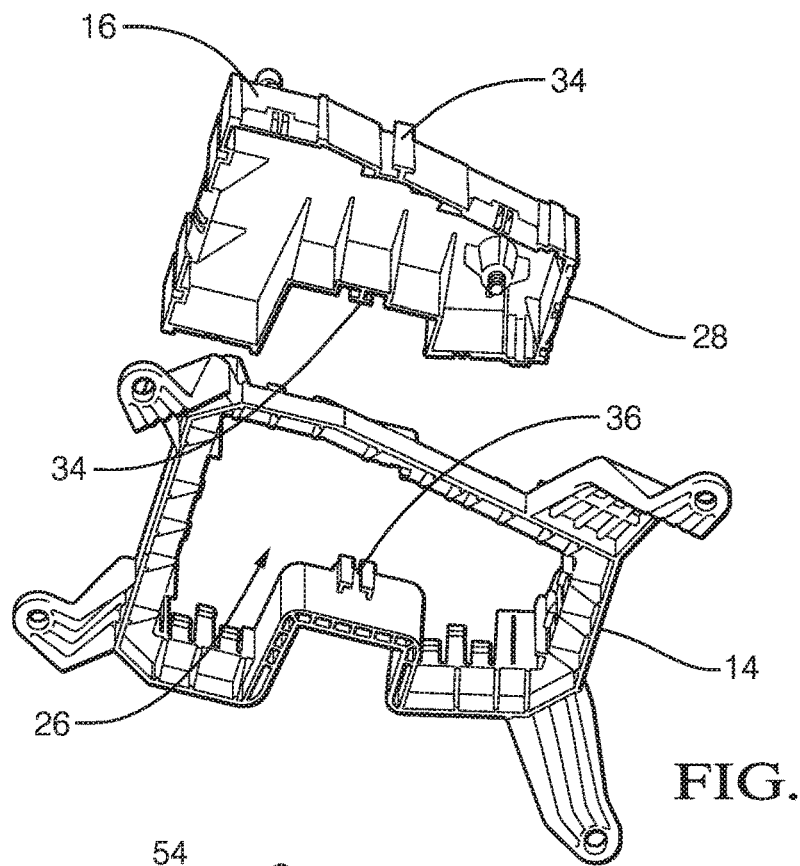
FIG. 6 illustrates the sensor support assembly of FIG. 4 before assembly viewed from the underside in accordance with one embodiment.
Figure 7:
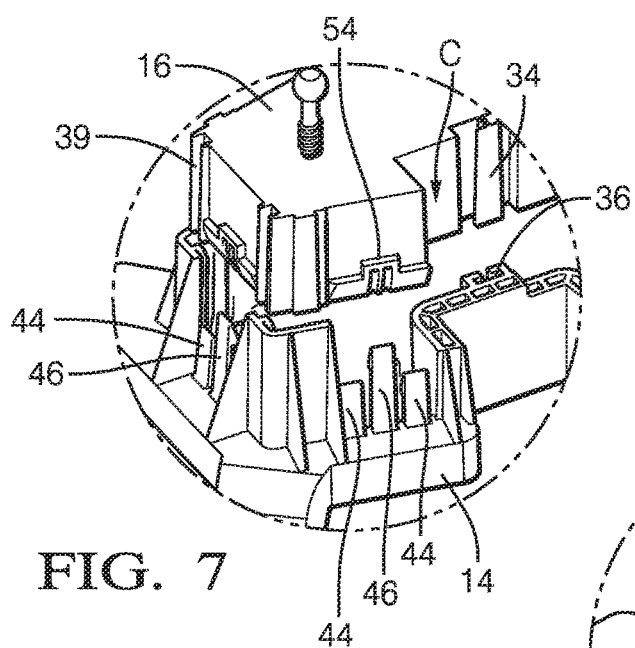
FIG. 7 are details of the support assembly in accordance with one embodiment.
Figure 8:
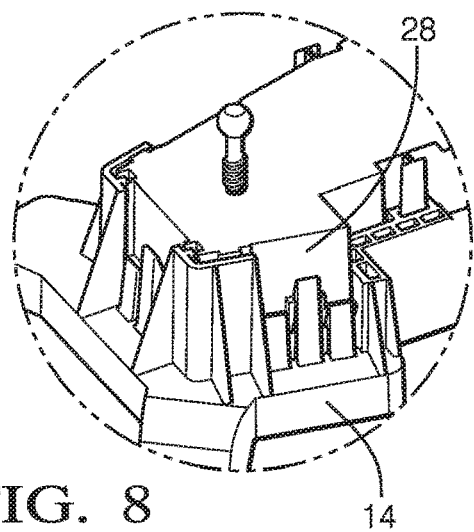
FIG. 8 are details of the support assembly in accordance with one embodiment.
Figure 9:
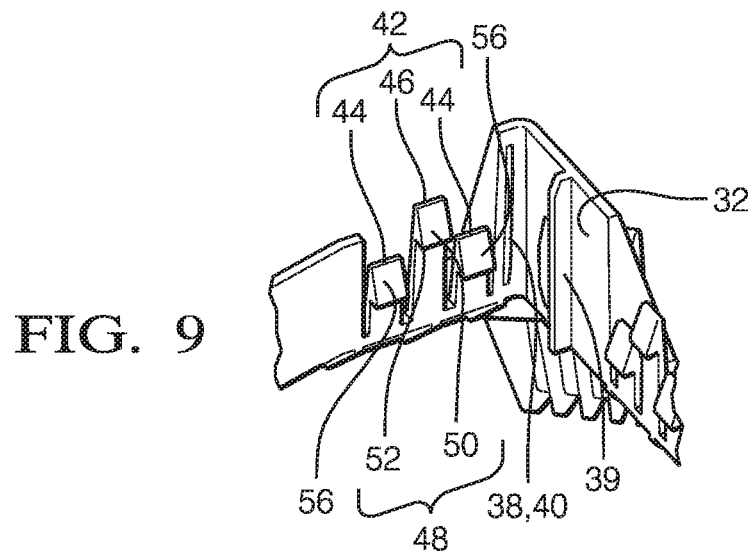
FIG. 9 are details of the support assembly in accordance with one embodiment.
Figure 10:
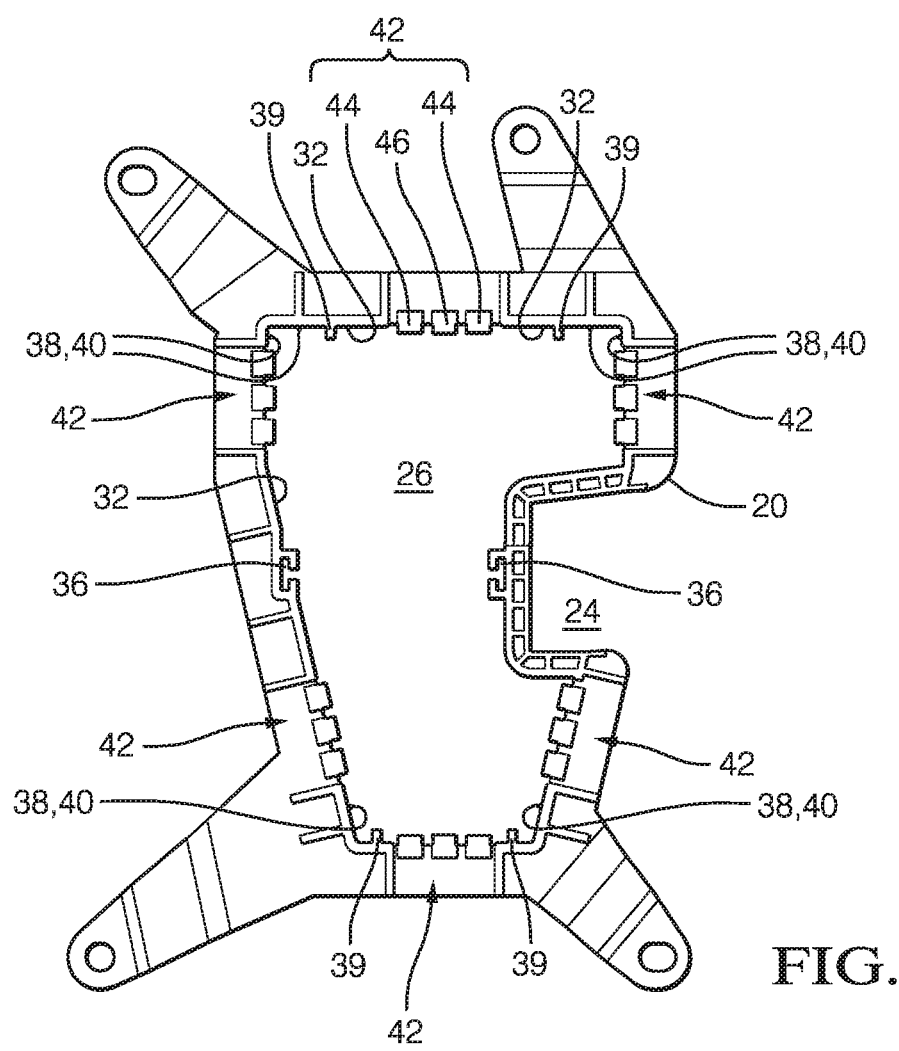
FIG. 10 are details of the support assembly in accordance with one embodiment.
Figure 11:
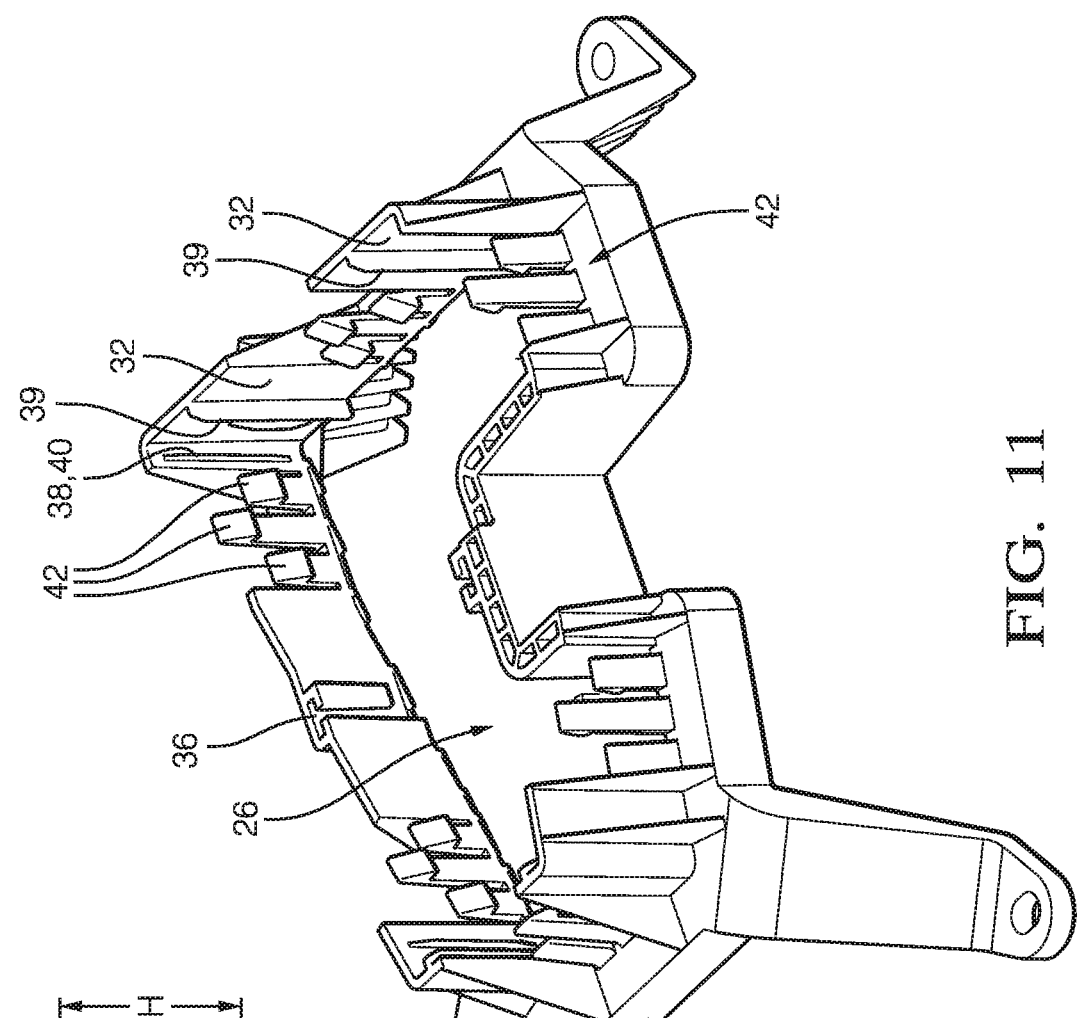
FIG. 11 are details of the support assembly in accordance with one embodiment.

The sensor support assembly 12 is now detailed in reference to FIGS. 4, 5 and 6 where is shown that the frame member 14 has a main frame portion 20 having four main lateral sides 22, one of which defining an inward cavity 24 adapted to receive a connector not show. The lateral sides 22 and inward cavity 24 define a polygonal shape, substantially rectangular (apart of the cavity 24) and, from the most distant corners of which extend the holding legs 18 arranged to maintain the frame portion 20 at a distance from the vehicle structure 8. The polygonal frame portion 20 surrounds the longitudinal recess 26 wherein is received the support member 16, the longitudinal recess 26 having a female polygonal shape complementary adjusted to the male shape of the support member 16. The support member 16 has longitudinal side faces 28 perpendicularly extending from the edges of a front face 30 adapted to receive the sensor 10. When assembled, as shown in FIG. 4, the longitudinal side faces 28 of the support member 16 are facing parallel opposed side faces of the recess 32. A peripheral clearance C is defined between the longitudinal side faces 28 of the support member 16 and the opposed side faces 32 of the frame member 14.

The sensor support assembly 12 further comprises means for longitudinally guiding the support member 16 within the longitudinal recess 26 of the frame member 14 while the support member 16 translates from the normal position P1 to the collapse position P2. The guiding means comprise male guiding members 34, having the T-shaped cross section, the vertical leg of the "T" extending from the longitudinal side face 28 of the support member 16 while the top horizontal bar of the "T" is engaged and slideably guided in a complementary female guiding member 36 integral to a side face 32 of the frame member 14. In the exemplary embodiment described and shown on the figures, the sensor support assembly 12 is provided with two of the male guiding member 34, 36 arranged on opposed faces. Alternative guiding means may be designed for instance by having more than two "T" arrangements or, by inverting the male and female guiding members 36 between the side faces 28, 32 of the frame member 14 and of the support member 16.

Figure 12:
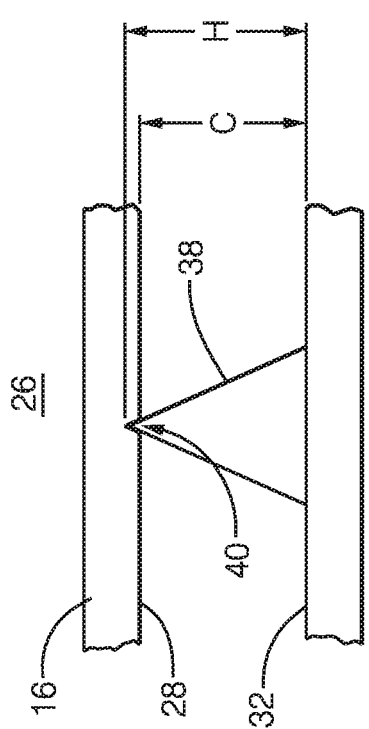
FIG. 12 are details of the support assembly in accordance with one embodiment.

Moreover, as shown on the magnified FIG. 12, for longitudinally guiding the displacement of the support member 16 in the longitudinal recess 26, the sensor support assembly 12 is provided with a plurality of longitudinal rails 38 protruding from side faces 32 of the frame member 14. The longitudinal rails 38 have a cross-section defining a longitudinal sharp edge 40 parallel to the side face 32 and arranged at a height H from the side face 32, the height H being just slightly superior to the clearance C so that, in the sensor support assembly 12 the longitudinal sharp edge 40 contacts the longitudinal side face 28 of the support member 16 and, when translating from the normal position P1 to the collapse position P2 the longitudinal sharp edge 40 scribes a longitudinal line in the longitudinal side face 28 of the support member 16. This arrangement advantageously improves the longitudinal guiding and prevents rotation of the support member 16 and avoids rattling noise due to minor movements of the support member 16 within the longitudinal recess 26. Alternatively, the longitudinal rail 38 can be integral to the support member 16 and scribe a face of the recess 26.

In a further alternative, additional rectangular guiding members 39 having a rib shape guidance, or rectangular section shape as shown on the figure, are added to further guide the support member 16.

The sensor support assembly 12 further comprises a plurality of holding sets 42 shown in details on FIGS. 7 to 11. The holding sets 42 are arranged around the longitudinal recess 26 and are parallel to the side faces 32, each of the holding sets 42 comprising two short elastic arms 44 arranged on both sides of a compliant long locking arm 46 retaining the support member 16 in the normal position P1, the three arms 44, 46 being aligned (i.e. the two short elastic arms 44 are aligned with the long locking arm 46).

More precisely, to arrange the support member 16 in its normal position P1, it is firstly presented aligned before the longitudinal recess 26 then, it is rearwardly longitudinally pushed in the recess 26. During this move the longitudinal side faces 28 of the support member 16 slide against the head 48 of the long locking arms 46 that consequently outwardly bend and comply to allow passage of the support member 16. Once the support member 16 reaches the normal position P1 the long locking arms 46 elastically bend back and hook, as a clip, the support member 16 in the normal position P1. Indeed, the head 48 of the long locking arms 46 define sloped faces 50 against which the longitudinal side faces 28 of the support member 16 slide and apply a longitudinal force, the outwardly oriented components of which force the long locking arms 46 to bend. The head 48 further defines a rearwardly oriented locking transverse face 52 provided in continuation to the sloped face 50. Complementary, the longitudinal side faces 28 of the support member 16 are provided with an integral locking member having a frontwardly oriented transverse face 54 and, when reaching the normal position P1, the locking faces 52, 54 engage with each other preventing removal of the support member 16 from the longitudinal recess 26.

Also, when approaching the normal position P1, before the complementary engagement of the locking faces 52, 54, the longitudinal side faces 28 of the support member 16 slide against sloped faces 56 arranged on the heads of the short elastic arms 44. Under the urging force, the short elastic arms 44 also comply and outwardly bend—As the short elastic arms 44 bend, they apply counter forces onto the longitudinal side faces 28 of the support member 16, the counter forces having longitudinal components frontwardly urging the support member 16 to exit the longitudinal recess 26.

In the normal position P1, the support member 16 is just engaged in the longitudinal recess 26, it is transversally positioned between the longitudinal sharp edges 40 of the rails, the male guiding member 34 is just partially inserted in the female guiding member 36, the short elastic arms 44 urge the support member 16 toward a frontward exit of the recess 26 and, the long locking arms 46 lock the support member 16 in position and prevent the frontward exit of the recess 26.

Each of the short elastic arm 44 generates on the support member 16 a frontward longitudinal force F2 and, the sensor support assembly 12 only collapses, the support member 16 translating from the normal position P1 to the collapse position P2, when the rearward longitudinal force F1 applied on the sensor 10, or on the front face 30 of the support member 16, exceeds the sum of the frontward longitudinal force F2, the sum defining the force threshold F0 below which the support member 16 resists to rearward move into the recess 26.

The frame member 14 and the support member 16 of the exemplary sensor support assembly 12 are both integral plastic molded parts comprising six holding sets 42, so six long locking arms 46 and twelve short elastic arms 44, two facing male/female guiding members 34, 36 and four longitudinal rails 38 having longitudinal sharp edges 40. Such sensor support assemblies 12 have been tested, measuring the necessary force to collapse the sensor support assembly 12 over the displacement of the support member 16.

Tests have been performed monitoring the frontal force increase, in Newton, and the insertion distance, in millimeter, of the support member 16 into the recess 26. The tests have shown a ramp-up of the force and of the insertion quite proportional up to a threshold that, depending on design parameters was between 300N and 1000N for an insertion of 2 mm to 5 mm. This ramp-up was followed by a sudden drop of the force down to 0 N and a final insertion stage to 6-10 mm.

While this invention has been described in terms of the preferred embodiments thereof, it is not intended to be so limited, but rather only to the extent set forth in the claims that follow.

LIST OF REFERENCES

X longitudinal axis
F0 force threshold
F1 force
P1 normal—pre-crash—position
P2 collapsed—post-crash—position
D1 distance
DC collapsed distance
C clearance
H height of a rail
8 vehicle structure
10 sensor
12 sensor support assembly
14 frame member
16 support member
18 legs
20 frame portion
22 main side of the frame portion
24 cavity
26 recess
28 side faces of the support member
30 front face of the support member
32 side faces of the recess
34 male guiding member
36 female guiding member
38 longitudinal rail
39 rectangular guiding member
40 sharp edge
42 holding set
44 short elastic arm
46 locking arm
48 head of the locking arm
50 sloped face of the head
52 locking face of the head
54 locking face of the support member
56 sloped face of the head of the short elastic arm

I claim:

1. A sensor support assembly, comprising:
   a frame member adapted to be fixed on a vehicle structure; and
   a support member adapted to be inserted in a recess defined in the frame member;
   the support member configured to receive a sensor on a front face of the support member;
   the support member configured to retain the sensor at or near a surface of a body panel of a vehicle that is susceptible to an impact from an object;
   the recess defining a longitudinal axis (X) along which the support member can displace from a normal position (P1) to a collapse position (P2) when an axial force (F1) from the impact applied on the support member exceeds a predetermined threshold (F0);
   the support member being substantially outside the recess in the normal position (P1) and substantially inside the recess in the collapse position (P2);
   the support member being guided during the displacement between side faces of the frame member and side faces of the support member; and
   a longitudinal rail arranged in a clearance (C) defined between the support member and the side faces of the frame member, the longitudinal rail being integral to the frame member and defining a longitudinal linear tip in contact against an opposing side face of the support member, wherein said longitudinal linear tip defines a sharp edge in permanent contact with said opposing side face.

2. The sensor support assembly as claimed in claim 1, further comprising a male guiding member cooperating with a complementary female guiding member aligned along said longitudinal axis (X).

3. The sensor support assembly as claimed in claim 2, wherein the male guiding member is integral to the support member and the complementary female guiding member is integral to the frame member.

4. The sensor support assembly as claimed in claim 2, wherein the male guiding member has a T-shaped cross section.

5. The sensor support assembly as claimed in claim 2, comprising a plurality of male and female guiding members cooperating with one other and arranged on opposing sides of the recess and of the support member.

6. The sensor support assembly as claimed in claim 1, wherein said sharp edge scribes an axial line in said opposing side face when the support member moves from the normal position (P1) to said collapse position (P2).

7. The sensor support assembly as claimed in claim 1, further comprising a compliant member holding the support member in the normal position (P1) as long as a longitudinal force applied on the support member is inferior to the predetermined threshold (F0), the compliant member breaking away and displacing under an influence of the support member moving from said normal position (P1) to said collapse position (P2).

8. The sensor support assembly as claimed in claim 7, wherein said compliant member comprises a short elastic arm extending from the frame member to a distant head in contact against a side face of the support member.

9. The sensor support assembly as claimed in claim 8, comprising a plurality of short elastic arms arranged around the support member.

10. The sensor support assembly as claimed in claim 1, further comprising a retaining member retaining the support member in the normal position (P1).

11. The sensor support assembly as claimed in claim 10, wherein said retaining member comprises a locking clip arranged at an end of a locking arm extending from the frame member, the locking clip defining a locking face engaged against a complementary locking face of the support member.

12. The sensor support assembly as claimed in claim 10, wherein said retaining member comprises a locking clip arranged at an end of a locking arm integral to the support member, the locking clip defining a locking face engaged against a complementary locking face of the frame member.

13. The sensor support assembly as claimed in claim 10, comprising a plurality of retaining members.

14. The sensor support assembly as claimed in claim 9 wherein, in the normal position (P1) the support member axially urges the plurality of short elastic arms which react by applying to the support member an axial counter force opposed to the collapse direction, the support member being kept in said normal position (P1) by said locking clip.

15. The sensor support assembly as claimed in claim 14 wherein the collapse threshold force (F0) is predetermined by said counter forces generated by the plurality of short elastic arms.

16. The sensor support assembly as claimed in claim 15 wherein a sum of the individual counter forces applied by each of the plurality of short elastic arms is equal to said predetermined threshold (F0).

17. The sensor support assembly as claimed in claim 16, comprising a plurality of holding sets arranged around the recess, each set comprising two short elastic arms applying counter forces and arranged on both sides of a locking arm retaining the support member in the normal position (P1), wherein the two short elastic arms are aligned with the locking arm.

18. The sensor support assembly as claimed in claim 2, wherein the male guiding member extends from at least one side face of one of the support member and the frame member and engages the complementary female guiding member extending from an opposite side face of one of the support member and the frame member.

19. The sensor support assembly as claimed in claim 2, wherein the complementary female guiding member defines a corresponding T-shaped slot.

20. The sensor support assembly as claimed in claim 1, wherein the displacement of the frame member is in a range of 2 mm to 10 mm.

21. The sensor support assembly as claimed in claim 1, wherein the predetermined threshold (F0) is between 300N and 1000N.

* * * * *